US009712057B1

(12) United States Patent
Chen et al.

(10) Patent No.: US 9,712,057 B1
(45) Date of Patent: Jul. 18, 2017

(54) FEEDBACK CONTROL CIRCUIT AND METHOD THEREOF

(71) Applicant: REALTEK SEMICONDUCTOR CORP., Hsinchu (TW)

(72) Inventors: Shih-Chieh Chen, Yilan County (TW); Chih-Cheng Lin, Hsinchu County (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 15/216,657

(22) Filed: Jul. 21, 2016

(30) Foreign Application Priority Data

Jan. 15, 2016 (TW) .............................. 105101211 A

(51) Int. Cl.
*G05F 1/00* (2006.01)
*H02M 3/158* (2006.01)
*H02M 1/00* (2006.01)

(52) U.S. Cl.
CPC ............. *H02M 3/158* (2013.01); *H02M 1/00* (2013.01); *H02M 2001/0025* (2013.01)

(58) Field of Classification Search
CPC .......... G05F 1/613; G05F 1/618; G05F 1/455; H02M 3/145; H02M 3/156; H02M 3/158; H02M 2003/1566

USPC .......................... 323/223, 241, 271, 282–285
See application file for complete search history.

(56) References Cited

U.S. PATENT DOCUMENTS

| 2008/0298106 A1 | 12/2008 | Tateishi | |
|---|---|---|---|
| 2010/0127680 A1* | 5/2010 | Satterfield | H02M 3/156 323/282 |
| 2012/0062189 A1* | 3/2012 | Wang | H02M 3/156 323/271 |

* cited by examiner

*Primary Examiner* — Adolf Berhane
*Assistant Examiner* — Afework Demisse
(74) *Attorney, Agent, or Firm* — Li & Cai Intellectual Property (USA) Office

(57) ABSTRACT

Disclosed are a feedback control circuit and a method thereof. The feedback control circuit includes a voltage comparator, a calibration voltage generator and processor. The voltage comparator receives a middle-point voltage and a calibration voltage, compares the middle-point voltage and calibration voltage, and outputs a reference voltage pulse signal. The calibration voltage generator generates the calibration voltage and outputs it to a switch driving circuit and the voltage comparator. The processor compares the pulse widths of the reference voltage pulse signal and a predetermined voltage pulse signal, and accordingly outputs a control signal to the calibration voltage generator to fine tune the calibration voltage. The switch driving circuit outputs a switch driving signal to a switching regulating circuit to adjust the timing when to turn on or off switches in the switching regulating circuit.

10 Claims, 4 Drawing Sheets

FEEDBACK CONTROL CIRCUIT AND METHOD THEREOF

BACKGROUND OF THE INVENTION

1. Field of the Invention

The instant disclosure relates to a feedback control circuit; in particular, to a feedback control circuit that can automatically adjust the timing for turning on or off switches in a switching regulating circuit.

2. Description of Related Art

Usually, in order to improve the efficiency of a switch regulator when it works in the light loading mode, a lower-bridge switch of the switch regulator will be turned off when the inductive current decreases to zero, such that the switch regulator will be in a Discontinuous Conduction Mode (DCM). Commonly, a comparator is used to determine whether the inductive current decreases to zero. However, it is often hard to precisely determine the timing when the inductive current decreases to zero because of an offset voltage of the comparator. As a result, a lower-bridge switch of the switch regulator may be turned off before or after the inductive current decreases to zero, which decreases the overall circuit efficiency of the switch regulator.

SUMMARY OF THE INVENTION

The instant disclosure provides a feedback control circuit used to adjust the timing for turning on or off switches in a switching regulating circuit. The switch regulating circuit is electrically connected to a switch driving circuit. The feedback control circuit comprises a voltage comparator, a calibration voltage generator and a processor. The voltage comparator receives and compares a calibration voltage and a middle-point voltage of the switch regulating circuit, and then outputs a reference voltage pulse signal. The calibration voltage generator is electrically connected to the voltage comparator and the switch driving circuit, and is configured to generate and transmit the calibration voltage to the switch driving circuit and the voltage comparator. The processor receives the reference voltage pulse signal and a predetermined voltage pulse signal, compares pulse widths of the reference voltage pulse signal and the predetermined voltage pulse signal, and then outputs a control signal to the calibration voltage generator to adjust the calibration voltage. The switch driving circuit outputs a set of switching driving signals to the switch regulating circuit according to the calibration voltage, to adjust the timing when to turn on or off the switches in the switching regulating circuit.

In one embodiment of the instant disclosure, the calibration voltage generator lowers the calibration voltage according to the control signal if the pulse width of the reference voltage pulse signal is larger than the pulse width of the predetermined voltage pulse signal. On the other hand, the calibration voltage generator raises the calibration voltage according to the control signal if the pulse width of the reference voltage pulse signal is smaller than the pulse width of the predetermined voltage pulse signal.

In one embodiment of the instant disclosure, the processor comprises a first counter, a second counter and a controller. The first counter is electrically connected to the voltage comparator, receives the reference voltage pulse signal and converts the pulse width of the reference voltage pulse signal into a first counting value. The second counter receives the predetermined voltage pulse signal, and converts the pulse width of the predetermined voltage pulse signal into a second counting value. The controller is electrically connected to the first counter and the second counter. Once receiving the first counting value and the second counting value, the controller compares the first counting value and the second counting value and outputs the control signal to the calibration voltage generator according to a comparison result, to adjust the calibration voltage.

The instant disclosure further provides a feedback control method used in a feedback control circuit. The feedback control circuit comprises a voltage comparator, a calibration voltage generator and a processor. The feedback control circuit is used to adjust the timing when to turn on or off switches in a switching regulating circuit. The switch regulating circuit is electrically connected to a switch driving circuit, the calibration voltage generator is electrically connected to the voltage comparator and the switch driving circuit, and the processor is electrically connected to the voltage comparator and the calibration voltage generator. The feedback control method comprising: receiving and comparing a calibration voltage and a middle-point voltage of the switch regulating circuit and outputting a reference voltage pulse signal, via the voltage comparator; generating and transmitting a calibration voltage to the switch driving circuit and the voltage comparator via the calibration voltage generator; and receiving a predetermined voltage pulse signal, comparing the pulse widths of the predetermined voltage pulse signal and the reference voltage pulse signal, and outputting a control signal to the calibration voltage generator to adjust the calibration voltage, wherein the switch driving circuit outputs a set of switch driving signals to the switch regulating circuit according to the calibration voltage, to adjust the timing when to turn on or off switches in the switching regulating circuit.

To sum up, in the feedback control circuit and the feedback control method provided by the instant disclosure, after comparing the pulse widths of the reference voltage pulse signal and the predetermined voltage pulse signal, a control signal is accordingly generated and outputted to the calibration voltage generator to adjust the calibration voltage. After that, the switch driving circuit outputs a set of switch driving signals to the switch regulating circuit according to the calibration voltage, to adjust the timing when to turn on or off switches in the switching regulating circuit. Thereby, when the switch regulating circuit turns from the heavy loading mode to the light loading mode, the lower-bridge switch of the switch regulating circuit can be accurately turned off on time. As a result, the negative inductive current in the switch regulating circuit can be prevented, and the overall circuit efficiency of the switch regulating circuit can be improved.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[One Embodiment of the Feedback Control Circuit]

Figure 1:
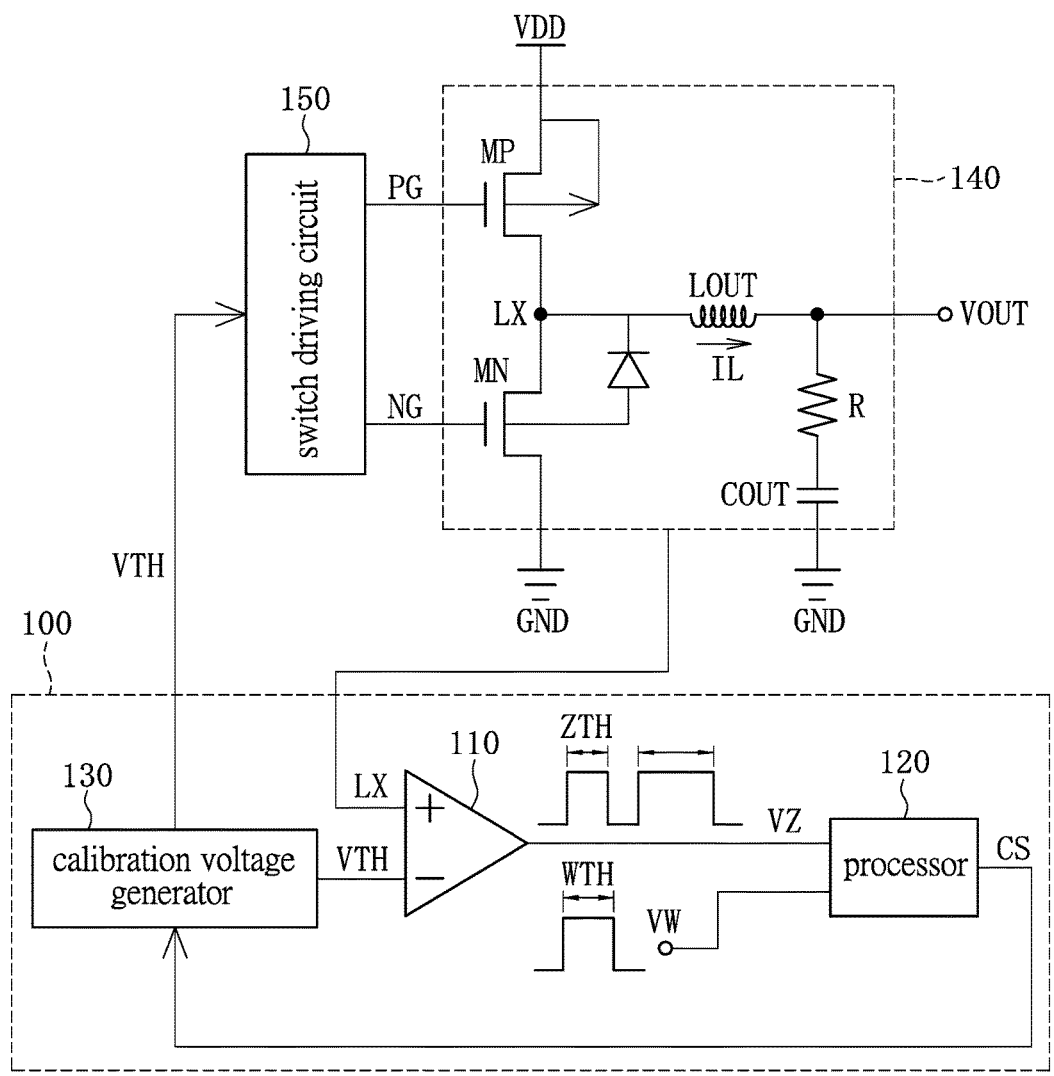
FIG. 1 shows a block diagram of a feedback control circuit of one embodiment of the instant disclosure.
Figure 2:
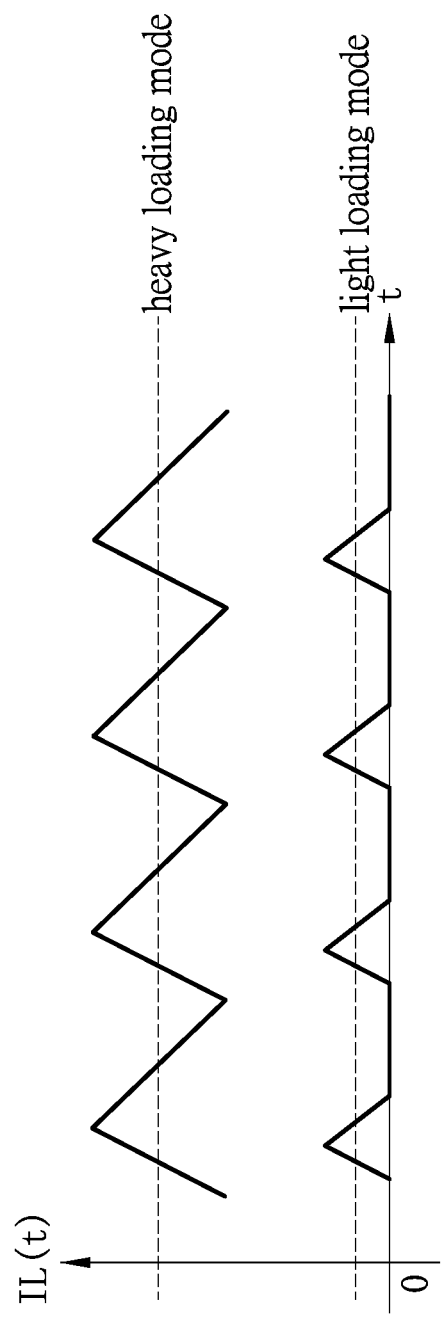
FIG. 2 shows a waveform diagram of the inductive current in the switch regulating circuit of one embodiment of the instant disclosure.

In conjunction with FIG. 1 and FIG. 2, FIG. 1 shows a block diagram of a feedback control circuit of one embodiment of the instant disclosure, and FIG. 2 shows a waveform diagram of the inductive current of one embodiment of the instant disclosure. As shown in FIG. 1, the feedback control circuit 100 comprises a voltage comparator 110, a processor 120 and a calibration voltage generator 130. The feedback control circuit 100 adjusts the timing when to turn on or off switches in the switching regulating circuit 140. In addition, the switch regulating circuit 140 is electrically connected to a switch driving circuit 150. The non-inverting input end of the voltage comparator 110 is electrically connected to the switch regulating circuit 140, and the inverting input end of the voltage comparator 110 is electrically connected to the calibration voltage generator 130. The calibration voltage generator 130 is electrically connected to the switch driving circuit 150. The processor 120 is electrically connected to the output end of the voltage comparator 110 and the calibration voltage generator 130.

The switch regulating circuit 140 comprises an upper-bridge switch MP, a lower-bridge switch MN, an inductor LOUT, a resistor R and a capacitor COUT. The switch driving signals comprise an upper-bridge switch driving signal PG and a lower-bridge switch driving signal NG. The gate of the upper-bridge switch MP receives the upper-bridge switch driving signal PG, and the source of the upper-bridge switch MP receives the power voltage VDD. The gate of the lower-bridge switch MN receives the lower-bridge switch driving signal NG. The drain of the lower-bridge switch MN is electrically connected to the drain of the upper-bridge switch MP, and the source of the lower-bridge switch MN is electrically connected to the grounding voltage GND. It is worth mentioning that the middle-point voltage LX is the voltage of the drain of the lower-bridge switch MN. One end of the inductor LOUT is electrically connected to the drain of the lower-bridge switch MN, and the other end of the inductor LOUT is electrically connected to one end of the resistor R. One end of the capacitor COUT is electrically connected to the other end of the resistor R, and the other end of the capacitor COUT is electrically connected to the grounding voltage GND. The switch regulating circuit 140 generates a continual pulse signal by switching the upper-bridge switch MP and the lower-bridge switch MN, and generates a direct voltage via a low frequency filter composed of the inductor LOUT and the capacitor COUT. The output voltage provides a stable direct voltage to a heavy load or a light load.

The following descriptions further illustrate the working principle of the feedback control circuit 100.

In this embodiment, the voltage comparator 110 receives and compares the calibration voltage VTH and the middle-point voltage LX of the switch regulating circuit 140, and then outputs a reference voltage pulse signal VZ to the processor 120, wherein the calibration voltage VTH is generated by the calibration voltage generator 130. The processor 120 receives the reference voltage pulse signal VZ and a predetermined voltage pulse signal VW, and compares the widths of the reference voltage pulse signal VZ and the predetermined voltage pulse signal VW. After that, according to a comparison result, the processor 120 outputs a control signal CS to the calibration voltage generator 130 to adjust the calibration voltage VTH, and then the adjusted calibration voltage VTH is fed-back to the switch driving circuit 150. To be detailed, the calibration voltage generator 130 lowers the calibration voltage VTH according to the control signal CS if the width ZTH of the reference voltage pulse signal VZ is larger than the width WTH of the predetermined voltage pulse signal VW. On the other hand, the calibration voltage generator 130 raises the calibration voltage VTH according to the control signal CS if the width ZTH of the reference voltage pulse signal VZ is smaller than the width WTH of the predetermined voltage pulse signal VW. It should be noted that, the above mentioned width WTH of the predetermined voltage pulse signal VW is predetermined. Finally, the switch driving circuit 150 outputs the switching driving signals PG and NG to the switch regulating circuit 140 according to the calibration voltage VTH, to adjust the timing when to turn on or off switches in the switching regulating circuit. Thereby, when the switch regulating circuit 140 turns from the heavy loading mode to the light loading mode, the lower-bridge switch MN can be accurately turned off on time because the switch driving circuit 150 has adjusted the timing when to turn on or off switches in the switching regulating circuit 140. FIG. 2 shows the waveform of the inductive current IL in the switch regulating circuit 140, wherein the switch regulating circuit 140 is originally in a heavy loading mode and later turns to be in a light loading mode. In FIG. 2, the waveform segments where the inductive current IL is zero indicate that there is no negative inductive current generated in the switching regulating circuit 140 when the switch regulating circuit 140 turns from a heavy loading mode to a light loading mode. The overall efficiency of the switch regulating circuit 140 can thus be improved.

In the following embodiments, only parts different from embodiments in FIG. 1 are described, and the omitted parts are indicated to be identical to the embodiments in FIG. 1. In addition, for easy instruction, similar reference numbers or symbols refer to elements alike.

[Another Embodiment of the Feedback Control Circuit]

Figure 3:
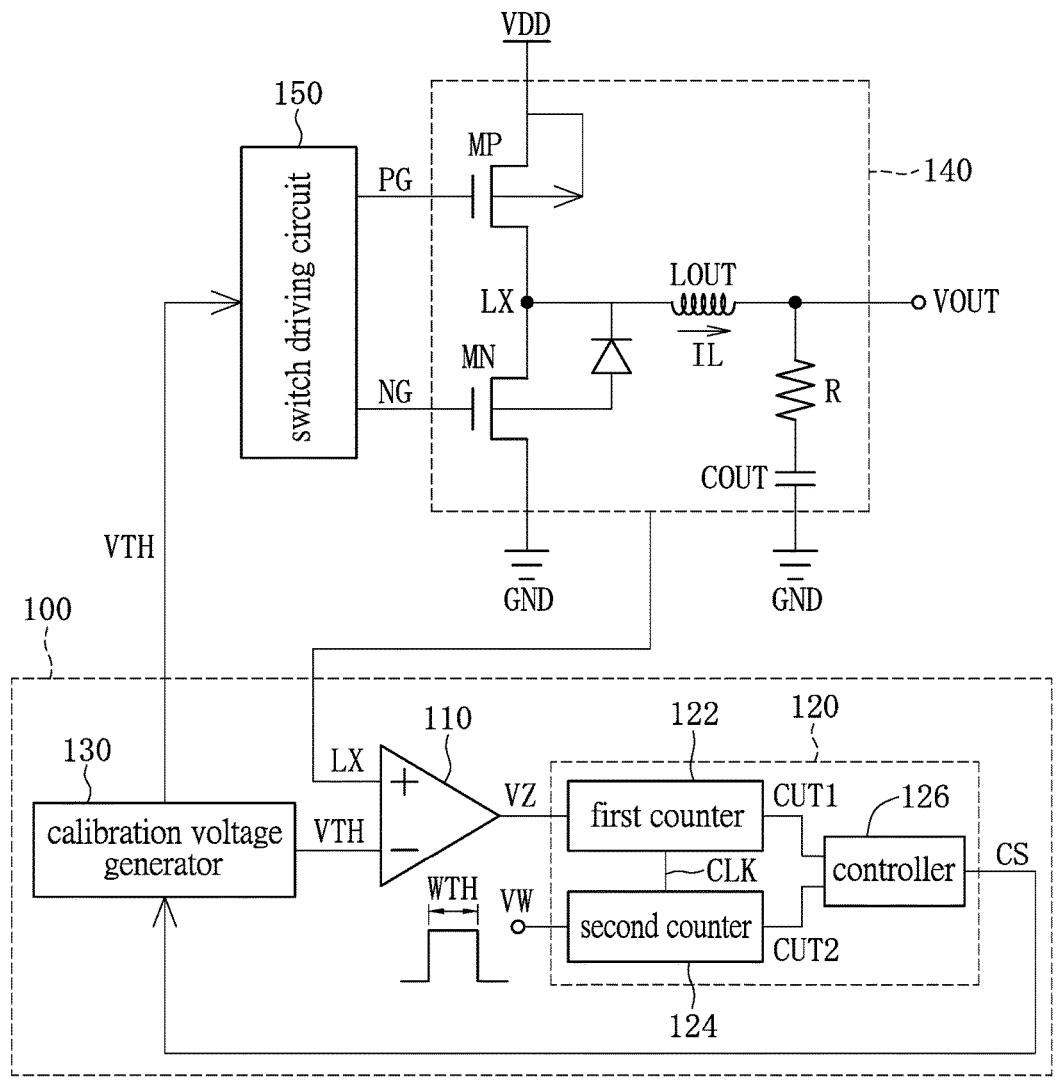
FIG. 3 shows a block diagram of a feedback control circuit of another embodiment of the instant disclosure.

Refer to FIG. 3. FIG. 3 shows a block diagram of a feedback control circuit of another embodiment of the instant disclosure. Different from the embodiment shown in FIG. 1, the processor 120 in this embodiment comprises a first counter 122, a second counter 124 and a controller 126. The first counter 122 is electrically connected between the output end of the voltage comparator 110 and the controller 126. The controller 126 is electrically connected to the first counter 122, the second counter 124 and the calibration voltage generator 130.

Specifically, the first counter 122 receives the reference voltage pulse signal VZ, and converts the pulse width of the reference voltage pulse signal VZ into a first counting value CUT1. On the other hand, the second counter 124 receives the predetermined voltage pulse signal VW, and converts the pulse width of the predetermined voltage pulse signal VW into a second counting value CUT2. It is worth mentioning that the first counter 122 and the second counter 124 simultaneously receive a clock signal CLK, and that the second counting value CUT2 is predetermined. After that, the controller 126 respectively receives and compares the first counting value CUT1 and the second counting value CUT2, and generates a comparison result. According to this comparison result, the controller 126 outputs a control signal CS to the calibration voltage generator 130 to adjust the calibration voltage VTH. After being adjusted, the calibration voltage VTH is fed-back to the switch driving circuit 150 to adjust the switch driving signals PG and NG, and thus the timing when to turn on or off the upper-bridge switch MP and the lower-bridge switch MN in the switching regulating circuit 140 is also adjusted.

The calibration voltage generator 130 lowers the calibration voltage VTH according to the control signal CS if the first counting value CUT1 is larger than the second counting value CUT2. On the other hand, the calibration voltage generator 130 raises the calibration voltage VTH according to the control signal CS if the first counting value CUT1 is smaller than the second counting value CUT2. Because of the above described working mechanism, when the switch regulating circuit turns from a heavy loading mode to a light loading mode, the lower-bridge switch in the switching regulating circuit can be accurately turned off on time. As a result, the negative inductive current in the switch regulating circuit can be prevented, and the overall circuit efficiency of the switch regulating circuit can be improved.

[One Embodiment of the Feedback Control Method]

Figure 4:
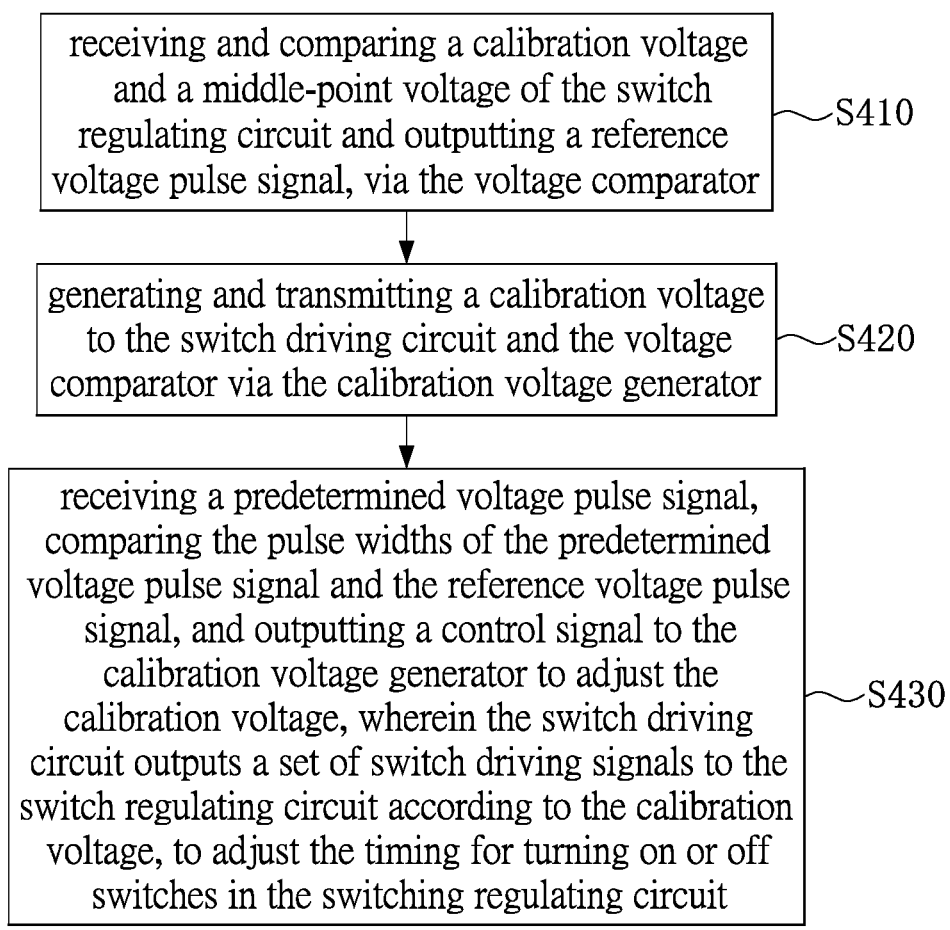
FIG. 4 shows a flow chart of a feedback control method of one embodiment of the instant disclosure.

Refer to FIG. 4. FIG. 4 shows a flow chart of a feedback control method of one embodiment of the instant disclosure. The method provided by this embodiment may be conducted in the feedback control circuits shown in FIG. 1 and FIG. 3, and thus please refer to FIG. 1 and FIG. 3 for further understanding.

The feedback control method comprises the steps as follows. In Step S410, the voltage comparator receives and compares a calibration voltage and a middle-point voltage of the switch regulating circuit, and then outputs a reference voltage pulse signal. After that, in Step S420, the calibration voltage generator generates and transmits a calibration voltage to the switch driving circuit and the voltage comparator. In Step S430, the processor receives a predetermined voltage pulse signal, compares the pulse widths of the predetermined voltage pulse signal and the reference voltage pulse signal, and accordingly outputs a control signal to the calibration voltage generator to adjust the calibration voltage. Finally, the switch driving circuit outputs a set of switch driving signals to the switch regulating circuit according to the calibration voltage, to adjust the timing when to turn on or off switches in the switching regulating circuit.

Relevant details of the steps of the feedback control method regarding the feedback control circuit are described in the embodiments of FIGS. 1-3, and thus not repeated here.

It is clarified that, a sequence of steps in FIG. 4 is set for a need to instruct easily, and thus the sequence of the steps is not used as a condition in demonstrating the embodiments of the instant disclosure.

To sum up, in the feedback control circuit and the feedback control method provided by the instant disclosure, after comparing the pulse widths of the reference voltage pulse signal and the predetermined voltage pulse signal, a control signal is accordingly generated and outputted to the calibration voltage generator to adjust the calibration voltage. After that, the switch driving circuit outputs a set of switch driving signals to the switch regulating circuit according to the calibration voltage, to adjust the timing when to turn on or off switches in the switching regulating circuit. Thereby, when the switch regulating circuit turns from the heavy loading mode to the light loading mode, the lower-bridge switch of the switch regulating circuit can be accurately turned off on time. As a result, the negative inductive current in the switch regulating circuit can be prevented, and the overall circuit efficiency of the switch regulating circuit can be improved.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A feedback control circuit, used to adjust the timing for turning on or off switches in a switching regulating circuit wherein the switch regulating circuit is electrically connected to a switch driving circuit, the feedback control circuit comprising:
    a voltage comparator, receiving and comparing a calibration voltage and a middle-point voltage of the switch regulating circuit and outputting a reference voltage pulse signal;
    a calibration voltage generator, electrically connected to the voltage comparator and the switch driving circuit, generating and transmitting the calibration voltage to the switch driving circuit and the voltage comparator; and
    a processor, receiving the reference voltage pulse signal and a predetermined voltage pulse signal, comparing pulse widths of the reference voltage pulse signal and the predetermined voltage pulse signal and outputting a control signal to the calibration voltage generator to adjust the calibration voltage;
    wherein the switch driving circuit outputs a set of switching driving signals to the switch regulating circuit according to the calibration voltage, to adjust the timing when to turn on or off the switches in the switching regulating circuit.

2. The feedback control circuit according to claim 1,
    wherein the calibration voltage generator lowers the calibration voltage according to the control signal if the pulse width of the reference voltage pulse signal is larger than the pulse width of the predetermined voltage pulse signal; and
    wherein the calibration voltage generator raises the calibration voltage according to the control signal if the pulse width of the reference voltage pulse signal is smaller than the pulse width of the predetermined voltage pulse signal.

3. The feedback control circuit according to claim 1, wherein the switch driving signals comprise an upper-bridge switch driving signal and a lower-bridge switch driving signal, and the switch regulating circuit comprises:
    an upper-bridge switch, having a gate receiving the upper-bridge switch driving signal and having a source receiving a power voltage; and
    a lower-bridge switch, having a gate receiving the lower-bridge switch driving signal, having a drain electrically connected to a drain of the upper-bridge switch and having a source electrically connected to a grounding voltage, wherein the middle-point voltage is the voltage of drain of the lower-bridge switch;
    an inductor, having one end electrically connected to a drain of the lower-bridge switch;
    a resistor, having one end electrically connected to the other end of the inductor; and a capacitor, having one end electrically connected to the other end of the resistor and having the other end electrically connected to the grounding voltage.

4. The feedback control circuit according to claim 1, wherein the processor comprises:
   a first counter, electrically connected to the voltage comparator, receiving the reference voltage pulse signal, and converting the pulse width of the reference voltage pulse signal into a first counting value;
   a second counter, receiving the predetermined voltage pulse signal, and converting the pulse width of the predetermined voltage pulse signal into a second counting value; and
   a controller, electrically connected to the first counter and the second counter, receiving and comparing the first counting value and the second counting value, and outputting the control signal to the calibration voltage generator according to a comparison result, to adjust the calibration voltage.

5. The feedback control circuit according to claim 4, wherein the first counter and the second counter simultaneously receive a clock signal, and the second counting value is predetermined.

6. The feedback control circuit according to claim 4,
   wherein the calibration voltage generator lowers the calibration voltage according to the control signal if the first counting value is larger than the second counting value; and
   wherein the calibration voltage generator raises the calibration voltage according to the control signal if the first counting value is smaller than the second counting value.

7. A feedback control method, used in a feedback control circuit, the feedback control circuit comprising a voltage comparator, a calibration voltage generator and a processor, wherein the feedback control circuit is used to adjust the timing for turning on or off switches in a switching regulating circuit, the switch regulating circuit is electrically connected to a switch driving circuit, the calibration voltage generator is electrically connected to the voltage comparator and the switch driving circuit, and the processor is electrically connected to the voltage comparator and the calibration voltage generator, the feedback control method comprising:
   receiving and comparing a calibration voltage and a middle-point voltage of the switch regulating circuit and outputting a reference voltage pulse signal, via the voltage comparator;
   generating and transmitting a calibration voltage to the switch driving circuit and the voltage comparator via the calibration voltage generator; and
   receiving a predetermined voltage pulse signal, comparing the pulse widths of the predetermined voltage pulse signal and the reference voltage pulse signal, and outputting a control signal to the calibration voltage generator to adjust the calibration voltage, wherein the switch driving circuit outputs a set of switch driving signals to the switch regulating circuit according to the calibration voltage, to adjust the timing when to turn on or off switches in the switching regulating circuit.

8. The feedback control method according to claim 7,
   wherein the calibration voltage generator lowers the calibration voltage according to the control signal if the pulse width of the reference voltage pulse signal is larger than the pulse width of the predetermined voltage pulse signal; and
   wherein the calibration voltage generator raises the calibration voltage according to the control signal if the pulse width of the reference voltage pulse signal is smaller than the pulse width of the predetermined voltage pulse signal.

9. The feedback control method according to claim 7, wherein the processor comprises:
   a first counter, electrically connected to the voltage comparator, receiving the reference voltage pulse signal, and converting the pulse width of the reference voltage pulse signal into a first counting value;
   a second counter, receiving the predetermined voltage pulse signal, and converting the pulse width of the predetermined voltage pulse signal into a second counting value; and
   a controller, electrically connected to the first counter and the second counter, receiving and comparing the first counting value and the second counting value, and outputting the control signal to the calibration voltage generator according to a comparison result, to adjust the calibration voltage.

10. The feedback control method according to claim 9,
    wherein lowering the calibration voltage via the calibration voltage generator according to the control signal if the first counting value is larger than the second counting value; and
    wherein raising the calibration voltage via the calibration voltage generator according to the control signal if the first counting value is smaller than the second counting value.

* * * * *